(12) United States Patent
D'Agostino

(10) Patent No.: US 7,840,486 B2
(45) Date of Patent: Nov. 23, 2010

(54) SYSTEM AND METHOD FOR PERFORMING SECURE CREDIT CARD PURCHASES

(76) Inventor: John D'Agostino, 6237 Weymouth Dr., Sarasota, FL (US) 34238

( * ) Notice: Subject to any disclaimer, the term of this patent is extended or adjusted under 35 U.S.C. 154(b) by 0 days.

(21) Appl. No.: 11/252,009

(22) Filed: Oct. 17, 2005

(65) Prior Publication Data

US 2006/0031161 A1  Feb. 9, 2006

Related U.S. Application Data

(63) Continuation of application No. 10/037,007, filed on Nov. 9, 2001, now abandoned, which is a continuation-in-part of application No. 09/231,745, filed on Jan. 15, 1999, now Pat. No. 6,324,526.

(51) Int. Cl.
*G06Q 40/00* (2006.01)

(52) U.S. Cl. .......................... 705/44; 705/41

(58) Field of Classification Search .................. 705/39, 705/40, 44
See application file for complete search history.

(56) References Cited

U.S. PATENT DOCUMENTS

| 3,938,091 A | 2/1976 | Atalla et al. |
| 4,423,316 A | 12/1983 | Sano et al. |

(Continued)

FOREIGN PATENT DOCUMENTS

| CA | 2167543 | 7/1997 |

(Continued)

OTHER PUBLICATIONS

Lee et al.: Evoluntionary business models for e-cash with smart cards, Korea Advanced Institute of Science and Technology, Korea, htp://koasas.kaist.ac.kr/bitstream/10203/4774/1/2000-092.pdf , pp. 352-358.*

(Continued)

*Primary Examiner*—Hani Kazimi
*Assistant Examiner*—Bijendra K Shrestha
(74) *Attorney, Agent, or Firm*—Maxey Law Offices, PLLC; Stephen Lewellyn

(57) ABSTRACT

A method and system of performing secure credit card purchases in the context of a remote commercial transaction, such as over the telephone, wherein only the customer, once generally deciding upon a product or service to be purchased, communicates with a custodial authorizing entity, such as a credit card company or issuing bank wherein such entity has previous knowledge of the credit card number as well as custodial control of other account parameters such as interest rate, payment history, available credit limit etc. The customer supplies the custodial authorizing entity with the account identification data such as the credit card number and a requested one of a possible plurality of predetermined payment categories which define the dollar amount for the purchase and specific, predetermined time parameters within which authorization by the custodial authorizing entity will remain in effect. The custodial authorizing entity then generates a transaction code which is communicated exclusively to the customer wherein the customer in turn communicates only the transaction code to the merchant instead of a credit card number. The transaction code is indicative of merchant identification, credit card account identification and a designated one of the plurality of predetermined payment categories.

30 Claims, 2 Drawing Sheets

U.S. PATENT DOCUMENTS

| | | | |
|---|---|---|---|
| 4,707,592 A | | 11/1987 | Ware |
| 4,720,860 A | | 1/1988 | Weiss |
| 4,725,719 A | | 2/1988 | Oncken et al. |
| 4,747,050 A | | 5/1988 | Brachtl et al. |
| 4,797,920 A | | 1/1989 | Stein |
| 4,893,330 A | * | 1/1990 | Franco ............... 379/91.02 |
| 5,097,505 A | | 3/1992 | Weiss |
| 5,130,519 A | | 7/1992 | Bush et al. |
| 5,163,097 A | | 11/1992 | Pegg |
| 5,193,114 A | | 3/1993 | Moseley |
| 5,196,840 A | | 3/1993 | Leith et al. |
| 5,202,826 A | | 4/1993 | McCarthy |
| 5,239,583 A | | 8/1993 | Parrillo |
| 5,287,268 A | | 2/1994 | McCarthy |
| 5,317,636 A | | 5/1994 | Vizcaino |
| 5,323,338 A | | 6/1994 | Hawthorne |
| 5,326,960 A | | 7/1994 | Tannenbaum |
| 5,350,906 A | | 9/1994 | Brody et al. |
| 5,363,449 A | | 11/1994 | Bestock |
| 5,428,684 A | | 6/1995 | Akiyama et al. |
| 5,466,919 A | | 11/1995 | Hovakimian |
| 5,478,994 A | | 12/1995 | Rahman et al. |
| 5,485,510 A | | 1/1996 | Colbert |
| 5,500,513 A | * | 3/1996 | Langhans et al. ......... 235/380 |
| 5,504,808 A | | 4/1996 | Hamrick, Jr. |
| 5,555,497 A | | 9/1996 | Helbling |
| 5,577,109 A | | 11/1996 | Stimson et al. |
| 5,583,918 A | | 12/1996 | Nakagawa |
| 5,606,614 A | | 2/1997 | Brady et al. |
| 5,621,201 A | | 4/1997 | Langhans et al. |
| 5,627,355 A | | 5/1997 | Rahman et al. |
| 5,671,279 A | | 9/1997 | Elgamal |
| 5,677,955 A | | 10/1997 | Doggett et al. |
| 5,694,471 A | | 12/1997 | Chen et al. |
| 5,696,908 A | | 12/1997 | Muehlberger et al. |
| 5,715,314 A | | 2/1998 | Payne et al. |
| 5,721,768 A | | 2/1998 | Stimson et al. |
| 5,724,424 A | | 3/1998 | Gifford |
| 5,727,163 A | | 3/1998 | Bezos |
| 5,729,594 A | | 3/1998 | Klingman |
| 5,748,908 A | | 5/1998 | Yu |
| 5,757,917 A | | 5/1998 | Rose et al. |
| 5,768,381 A | | 6/1998 | Hawthorne |
| 5,777,305 A | | 7/1998 | Smith et al. |
| 5,777,306 A | | 7/1998 | Masuda |
| 5,794,221 A | | 8/1998 | Egendorf |
| 5,815,657 A | | 9/1998 | Williams et al. |
| 5,822,737 A | | 10/1998 | Ogram |
| 5,825,881 A | | 10/1998 | Colvin, Sr. |
| 5,826,241 A | | 10/1998 | Stein et al. |
| 5,826,243 A | | 10/1998 | Musmanno et al. |
| 5,832,087 A | | 11/1998 | Hawthorne |
| 5,845,281 A | * | 12/1998 | Benson et al. ............. 1/1 |
| 5,864,830 A | | 1/1999 | Armetta et al. |
| 5,868,236 A | | 2/1999 | Rademacher |
| 5,883,810 A | | 3/1999 | Franklin et al. |
| 5,890,137 A | | 3/1999 | Koreeda |
| 5,893,907 A | | 4/1999 | Ukuda |
| 5,903,878 A | | 5/1999 | Talati et al. |
| 5,914,472 A | * | 6/1999 | Foladare et al. ............ 235/380 |
| 5,953,710 A | * | 9/1999 | Fleming ................ 705/38 |
| 5,956,699 A | | 9/1999 | Wong et al. |
| 5,984,180 A | | 11/1999 | Albrecht |
| 5,991,749 A | * | 11/1999 | Morrill, Jr. ............ 705/44 |
| 5,991,750 A | * | 11/1999 | Watson ............... 705/44 |
| 6,000,832 A | * | 12/1999 | Franklin et al. ............ 700/232 |
| 6,014,650 A | * | 1/2000 | Zampese ............... 705/44 |
| 6,029,150 A | * | 2/2000 | Kravitz ............... 705/39 |
| 6,029,890 A | | 2/2000 | Austin |
| 6,144,948 A | | 11/2000 | Walker et al. |
| 6,163,771 A | * | 12/2000 | Walker et al. ............ 705/18 |
| 6,188,761 B1 | | 2/2001 | Dickerman et al. |
| 6,226,624 B1 | * | 5/2001 | Watson et al. ............ 705/44 |
| 6,240,397 B1 | | 5/2001 | Sachs |
| 6,267,292 B1 | | 7/2001 | Walker et al. |
| 6,298,335 B1 | | 10/2001 | Bernstein |
| 6,324,526 B1 | | 11/2001 | D'Agostino |
| 6,339,766 B1 | | 1/2002 | Gephart |
| 6,341,724 B2 | | 1/2002 | Campisano |
| 6,343,279 B1 | | 1/2002 | Bissonette et al. |
| 6,375,084 B1 | | 4/2002 | Stanford et al. |
| 6,422,462 B1 | | 7/2002 | Cohen |
| 6,456,984 B1 | * | 9/2002 | Demoff et al. ............ 705/40 |
| 6,598,031 B1 | | 7/2003 | Ice |
| 6,636,833 B1 | | 10/2003 | Flitcroft et al. |
| 2001/0011249 A1 | * | 8/2001 | Yanagihara et al. ......... 705/41 |
| 2002/0120587 A1 | | 8/2002 | D'Agostino |
| 2002/0152158 A1 | * | 10/2002 | Paleiov et al. ............ 705/39 |
| 2003/0018567 A1 | | 1/2003 | Flitcroft et al. |
| 2003/0028481 A1 | | 2/2003 | Flitcroft et al. |
| 2003/0097331 A1 | | 5/2003 | Cohen |
| 2003/0216997 A1 | | 11/2003 | Cohen |

FOREIGN PATENT DOCUMENTS

| | | |
|---|---|---|
| EP | 0 081 921 A1 | 6/1983 |
| EP | 0 590 861 A2 | 4/1994 |
| EP | 0 590 861 A3 | 4/1994 |
| EP | 0 590 961 A2 | 4/1994 |
| FR | 2 661 996 A1 | 11/1991 |
| GB | 2 145 265 A | 3/1985 |
| GB | 2 252 270 A | 8/1992 |
| GB | 2 327 831 A | 2/1999 |
| GB | 2 361 790 A | 10/2001 |
| WO | WO 91/12693 | 5/1992 |
| WO | WO 93/14476 | 7/1993 |
| WO | WO 95/07512 | 3/1995 |
| WO | WO 96/08756 | 3/1996 |
| WO | WO 96/42150 | 12/1996 |
| WO | WO 97/15893 | 5/1997 |
| WO | WO 97/19549 | 5/1997 |
| WO | WO 98/26376 | 6/1998 |
| WO | WO 99/49424 | 9/1999 |
| WO | WO 00/42486 | 7/2000 |

OTHER PUBLICATIONS

Jones, R.: Prepaid cards, an emerging internet payment mechanism, the Nuvantage Group, Jun. 2001, pp. 1-9.*

Eran Gabber and Abraham Silberschatz, A Minimal Distributed Protocol for Electronic Commerce, www.usenix.org/publications (Article), Oakland, USA, Nov. 18-21, 1996.

Citi.com, Total Fraud Protection . . . Solutions for your safety and peace of mind, (printout) CBSD002144-CBSD002153.

Owen Thomas, Money Changers, www.ecompany.com, (Article), Oct. 2000.

Netchex—a short brief, www.tml.hut.fi/StudiesiTik-110.50/1997/Ecomerce/netchex-5.html, (Article), Nov. 5, 2002.

GE Capital Financial Inc., GE Pre-Authorization System, (GE's website printout).

Matt Barthel, Diebold Plans Major Push in Market for Debit-Card Point of Sale Terminals, Sep. 28, 1993, American Banker, pp. 1-2.

Bob Woods, New Dell E-Commerce Guarantee Called "Weak", Aug. 13, 1998, Newbytes News pp. 1-2.

Anne Finnigan, The Safe Way to Shop Online, Good Housekeeping, Sep. 1998, pp. 1-2.

Paul Demery, Attaching the Smart Card Fortress, Credit Card Management, Sep. 1998, pp. 1-4.

Larry Chase, Taking Transactions Online, Target Marketting, Oct. 1998, 1-4.

Virtual Credit Card (VCC), www.geocites.com/Eureka/Park/5014/vcc.htm, (printout). Jun. 28, 1999.

Smart Cards, disc.cba.uh.edu, (printout), Nov. 1, 2001.

Vincent Moscaritolo & Robert Hettinga, Digital Commerce for the Rest of Us Apple in a Geodesic Economy, www.shipwright.com/rants/rant_15.html, (article), Sep. 4, 1996.

Black Ives & Michael Earl, Mondex International Reengineering Money, London Business School Article, isds.bus.Isu.edu/cases/mondex.html, Nov. 1, 2001.

Smart Card New Ltd's Information Gateway, www.smartcard.co.uk/articles/electronicmoney.html, Nov. 1, 2001.

Putting Risk in Perspective, (Article) Internet Outlook (Jul. 20, 1997), vol. 1 No. 3, www.webreference.com, Nov. 1, 2001.

Keith Lamond,Credit Card Transactions Real World and Online. www.virtualschools.edu/mon/ElectronicProperty/klamond/credit_card.htm, Sep. 11, 2001.

Steven P. Ketchpel & Andreas Paepcke, Shopping Models: A Flexible Architecture for Information Commerce, dbpubs.stanford.edu:8090, Oct. 1, 2002, (Stanford, USA).

Re-examination of U.S. Patent No. 6,324,526 granted to John D'Agostino, assigned U.S. Appl. No. 90/007,481, filed Mar. 28, 2005.

* cited by examiner

SYSTEM AND METHOD FOR PERFORMING SECURE CREDIT CARD PURCHASES

The present application is a Continuation of U.S. patent application Ser. No. 10/037,007, filed Nov. 4, 2001 now abandoned, which is a continuation-in-part of U.S. patent application Ser. No. 09/231,745, filed on Jan. 15, 1999, now U.S. Pat. No. 6,324,526, issued on Nov. 27, 2001.

BACKGROUND OF THE INVENTION

1. Field of the Invention

This invention relates to a system and method of performing secure credit card purchases in connection with remote commercial transactions, wherein a credit card holder does not have to reveal their credit card number to a merchant or a mechanism controlled by the merchant in order to accomplish a purchase, and wherein the merchant is still assured of the necessary credit verifications and approvals prior to authorizing and/or completing a credit card transaction, thereby increasing overall security by minimizing any access to credit card numbers without having to substantially modify or deviate from existing, accepted credit card transaction practices.

2. Description of the Related Art

The utilization of credit and debit cards to conduct transactions is ever increasing. This is especially the case with remote or "mail-order" transactions wherein merchants desire to be assured of a payment prior to shipping a product. For example, recent years have seen a substantial increase in the popularity of televised shopping networks to further supplement the popularity of catalogue type sales. Moreover, the increasing use and popularity of distributed computer networks such as the internet has also contributed to the dramatic increase in the number of remote commercial transactions conducted every day.

One primary reason associated with the rapid growth of remote commercial transactions is the ability of a merchant to reach an almost limitless number of potential customers at a substantially insignificant cost and with little or no operating overhead since an actual store is not required. Additionally, such sales techniques permit customers to view the products and services in a greatly expanded marketplace, representing a great number of vendors, without extensive travel and without foregoing the privacy and convenience of their home or other predetermined computer site in some cases. Simply put, a telephone or like communication avenue is all that is needed to place the consumer in contact with the merchant and complete the transaction.

The vast increase in popularity of remote commercial transactions conducted over the telephone or internet is further facilitated by the relatively simple protocols and procedures necessary to conduct such transactions. In particular, in order to complete a valid transaction, a merchant need not physically see the customer or the credit card, but must merely accept and enter a customer's credit card account number and an expiration date thereof to obtain authorization. This same convenience, however, is the primary disadvantage and/or problem associated with conducting commerce in the manners set forth above. Specifically, there is a great reluctance on the part of the customer to transmit the credit card account information, including the credit card number, because of the proliferation of fraud, and a well recognized lack of security directed to the protection of such account information. Indeed, it has been established that security and privacy concerns are realistic due to the fact that credit card account data is easily readable or interceptable by unauthorized parties, and can be readily used for all types of remote transactions with minimal risk of being physically caught. In fact, unscrupulous individuals have many ways of gaining access to a consumer's legitimate remote transactions and thereby obtaining the credit card information. This information can be obtained from old credit card receipts or even from the unauthorized notation and use of the information by merchants or their employees after a legitimate transaction is made. Naturally, the latter is the most difficult to prevent utilizing known methods and systems unless a consumer is willing to completely forego the use of a credit card for purchases.

In the case of computerized remote transactions, as messages, including account data or other confidential information, move across the internet, they can easily pass through numerous computers, any one of which can be utilized to copy such confidential information or data, thereby leading to a further risk of potential fraud when conducting such transactions. Presently, some companies currently seek to address such security and privacy concerns by the employment of encryption programs and techniques. To this end there is an extensive facility associated with both public and private encryption schemes being deployed in order to guard the private or secured information being transmitted across the internet or like world wide networks. Unfortunately, however, even with such encryption techniques, the account information must usually still ultimately be transmitted to a third party who did not previously have access to that information previously. Even some more sophisticated systems which seek to interpose a separate computer or encryption entity between the consumer and the merchant so as to obtain authorization and forward it to the merchant, that information must still be made available to and/or transmitted to that third party, thereby leaving open an avenue for fraud or theft. Further, such encryption techniques, even if minimally effective for computerized remote transactions, are not truly useable for other conventional types of remote transactions, or even normal in person transactions.

Based on the above, there is an obvious need in the field of art associated with remote commercial transactions for a system and method of performing secure credit card purchases of goods and services which truly reduces the risk of potential fraud and theft by eliminating outside access to a consumer's private credit card information without requiring complex encryption equipment or significantly altering the ease and convenience of current transaction techniques. Further, such a system and method should also be effective for use in conventional, "in person" transactions as well, thereby providing an added measure of security and minimizing the hazards associated with the passing on of account information by unscrupulous merchants. Also, such a system should provide limits to potential loss or liability in a manner which does not impede the transaction.

SUMMARY OF THE INVENTION

The present invention is directed towards a system and method of performing secure credit card purchases, wherein payment for goods or services purchased is efficiently accomplished while eliminating the necessity of disclosure or dissemination of a consumers specific credit card number or other account data which the customer or other individual may wish to maintain in confidence. The system and method of the present invention incorporates the advantage of consummating the purchase by the customer through the selection of any one of a plurality of predetermined payment categories. Collectively, the payment categories represent a variety of methods for accomplishing payment for a fixed transaction, a multiple transaction and/or a repeating transaction.

One embodiment of the system and method of the present invention comprises a customer receiving information, including specific data necessary for the purchase of any given product or service. This promotional information generated by the merchant can be received by any of a plurality of conventional means including advertisements, catalogues, computer network connections, direct person to person customer and merchant contact, telephone solicitation, mail orders, etc. Once the customer has identified the product or services which he/she wishes to purchase, the customer contacts and supplies a custodial authorizing entity with the requisite information concerning both the identification of a specific credit card or debit card account and a requested payment category. Additionally, security against unauthorized use of confidential account data may also preferably include information relating to the merchant's identification and/or location.

The custodial authorizing entity is preferably defined as the entity which has or has been assigned the custodial responsibility for the financial account data of a customer's credit card account, including a previous knowledge of the credit card number and other information such as credit limits, payment history, available credit amounts and other information which will determine the status of a given credit card account in terms of authorizing a requested payment for a current purchase.

As part of the security system for accomplishing a commercial transaction utilizing credit card or debit card payment, the custodial authorizing entity includes sufficient facilities, preferably including a processing computer or like applicable hardware for the generation of an exclusive transaction code. The transaction code is to be used in substitution for the credit card number and when utilized as authorized, will issue the merchant a credit approval, and will accomplish payment for the goods or services desired in the normal fashion normally associated with a credit or debit card transaction, without the publication or dissemination of an identifying credit card number for a specific customer's account to any entity that is not already aware of that information.

Further, a feature of the transaction code is its ability to indicate any one of preferably a plurality of predetermined payment categories which may be either requested by the customer or automatically chosen by the custodial authorizing entity based on the type of account or the type of purchase or other commercial transaction involved. Each of the payment categories are reflective of a different type of payment desired or required to consummate the intended purchase. More specifically, the plurality of payment categories may include a single transaction involving a specific dollar amount for a purchase within a specific time period, such as twenty four hours, during which authorization of the purchase remains valid. Alternately, a single transaction may be involved wherein a maximum limit or a dollar amount is determined above which the purchase will become invalidated and further wherein a fixed period of time is preferably established for maintaining authorization of such purchase. Other alternatives would involve one or more of the categories coded to define multiple transactions involving a maximum dollar amount for purchases, as well as a fixed period of time for authorization of such purchases, and/or a repeating transaction wherein payments may be automatically accessed by a merchant over a predetermined or unspecified time interval (such as every thirty days) for a specific dollar amount or a maximum dollar amount limit. Also, limits solely as to a specific merchant or a given time period can be effectively established for which the transaction code is valid.

A further feature of the present invention to be described in greater detail hereinafter, is the requirement that the transaction code, once received by the customer is transmitted to the merchant by the customer or a person specifically authorized by the customer. Only minimal contact by the merchant and the custodial authorizing entity is provided for purposes of the merchant verifying the validity of the transaction code utilizing a conventional process electronically or otherwise similar to the verification of a credit card number normally offered to a merchant for the purchase of goods or services. There is, therefore, no disclosure, publication or other dissemination of the specific credit card number of a given customer account beyond those entities who already know the information, and the transaction code is transmitted exclusively to the customer by the custodial authorizing entity who has the ability to better identify whether the customer is properly authorized to use the account. Moreover, the transaction code, once given out by the customer, only has a limited usefulness, thereby limiting the risk of misuse and minimizing the potential losses to be experienced by the credit card company and/or the account holder.

Accordingly, it is an object of the present invention to provide a system and attendant method for performing remote commercial transactions utilizing credit cards, which maximizes the security of the transaction and limits the potential liability to be experienced from a fraudulent transaction.

Yet another object of the present invention is to provide a secure system and method for establishing credit card purchases which eliminate the disclosure or dissemination of the actual credit card number to anyone other than a custodial authorizing entity which normally has custodial responsibilities for account information including the previously established credit card number.

It is another object of the present invention to provide a system and method of establishing secure credit card purchases through the generation of a transaction code which renders it extremely difficult or impossible to access or infiltrate a customer's credit card account by unauthorized means.

It is yet another object of the present invention to provide a secure method of completing a remote commercial transaction which eliminates the need to convey actual account information to a merchant, but which allows the merchant to conduct a normal verification of information needed to consummate a given purchase.

It is also an object of the present invention to provide a system and attendant method of accomplishing secure credit card purchases which eliminate the need to disclose or disseminate a given credit card number while providing the customer with the versatility of choosing any one of a plurality of predetermined payment categories.

It is yet another feature of the present invention to provide a system and method of accomplishing secure credit card payments having the versatility of allowing the customer to select any one of a plurality of payment categories which are indicative of a variance in the amount of a purchase as well as the time in which authorization for such payment is valid.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As shown in the accompanying Figures, the present invention is directed towards a system and method for accomplishing secure credit card purchases. Moreover, these purchases can be "in person", but preferably include remote commercial transactions such as mail order, purchases over the internet, television solicitations, telephone solicitations, etc. Security is established by virtue of the elimination of the need to disclose an active credit card number and expiration date to the merchant or any other party other than the original credit card company, issuing bank or like financial institution which already has custodial responsibilities for the financial or account data associated with a given customer's credit card account.

Figure 1:
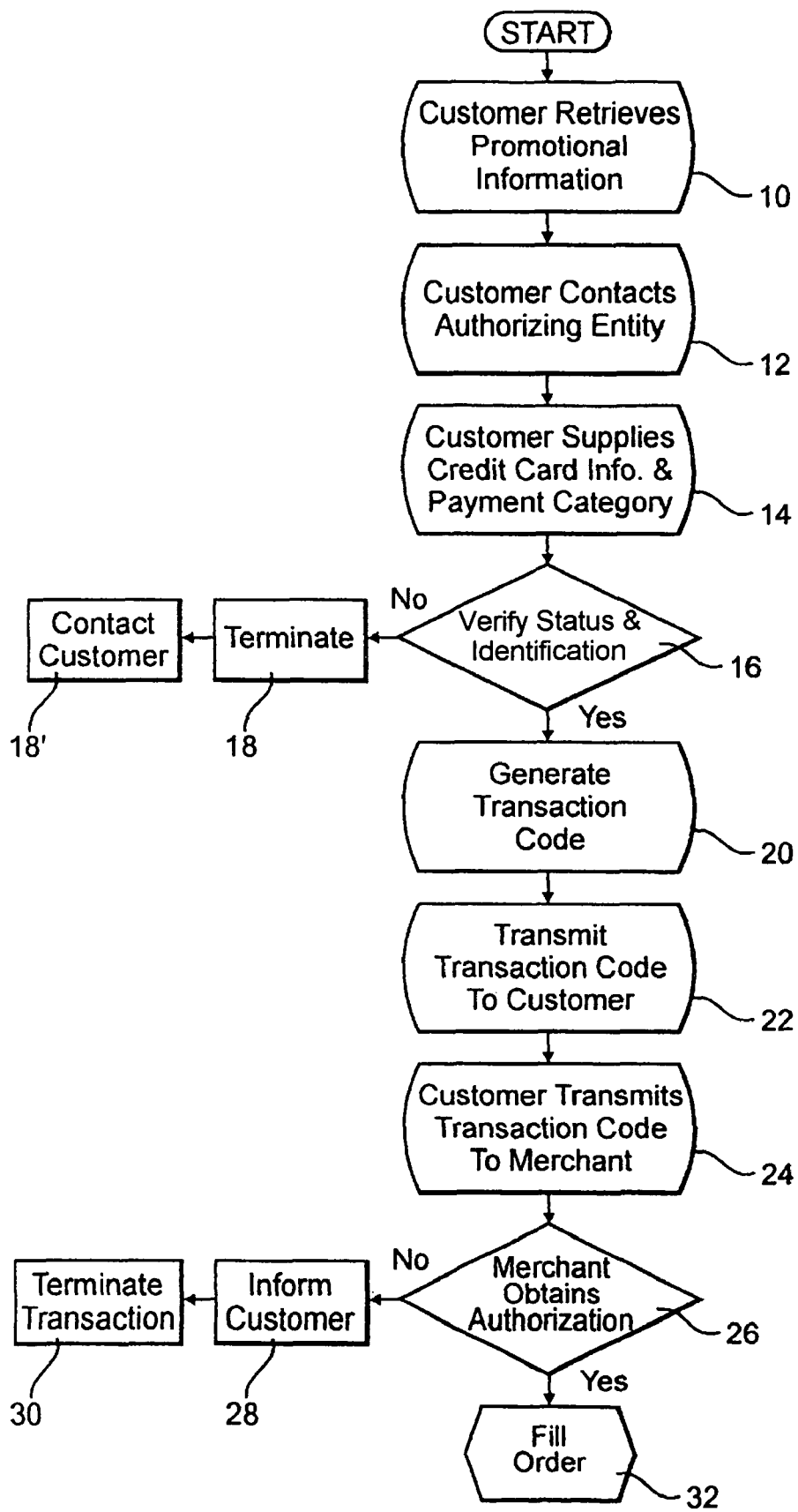
FIG. 1 is a schematic representation of a flow chart showing various steps involved in the performance of the system and method of the present invention for the secure credit card purchasing.

More specifically and with reference to FIG. 1 the system as well as an attendant method is preferably instigated by the customer viewing a product, identifying a desired amount for a transaction and/or receiving promotional information as at 10, either in person or by any of the electronic or more conventional techniques which will be described in greater detail with reference to FIGS. 2 through 3. Once the customer reviews the product or promotional information and has sufficient information, such as including price, product or service identification, payment requirement, etc., regarding the remote commercial transaction to be conducted, the customer contacts, either by computer, telephone or in person, a custodial authorizing entity as at 12. The custodial authorizing entity may herein be defined as comprising that entity or institution which has or has been designated by the entity which has custodial responsibility for the financial data and security of a given credit card account of a customer. As set forth above such custodial authorizing entity can be represented by the credit card company issuing a credit card to a given customer or alternately can be represented by a bank or other financial institution serving to sponsor a credit card or debit card to the extent of processing the debits and credit associated therewith. The authorizing entity's custodial responsibilities of course includes the previous knowledge and/or storage of the credit card number serving to identify a specific customer's credit card account. Once contacted, the customer then supplies appropriate identification data to inform the custodial authorizing entity of a specific customer's credit card account as at 14. In addition, the customer will supply the custodial authorizing entity with additional required information needed to consummate the purchase as well as ensure the security of the account in order to prevent its unauthorized use. Such additional information may preferably include the identification of the merchant or merchants involved, when such information is deemed necessary, and a requested one of a plurality of predetermined payment categories to facilitate consummation of the purchase of the products or services desired. Such predetermined plurality of payment categories will be discussed in greater detail hereinafter.

Once the appropriate information has been received from the customer as indicated at 16, the custodial authorizing entity verifies the credit card status and account identification of the customer to determine the viability of the account in terms of dollar amount limits, payment history, available credit balance, etc. If the accessed credit card account is not in good standing, the custodial authorizing entity will permanently or temporarily terminate the transaction as at 18 and/or communicate to the customer directly as at 18' by any applicable means for purposes of informing the customer of the unacceptable status of the accessed credit card account. If the credit card account is in good standing, based at least in part on the requested payment category, (amount of payment), the custodial authorizing entity generates a transaction code as at 20. The transaction code is used in substitution for the specific credit card number which would normally identify a customer's credit card account and would allow access thereto by any entity having possession of the credit card number whether or not such possession was authorized or unauthorized. More specifically, the transaction code is pre-coded to be indicative of a specific credit card account, preferably a merchant or merchants identification and a designated payment category, selected from the plurality of predetermined payment categories as set forth above. Once generated, the transaction code is communicated exclusively to the authorized and verified customer by the custodial authorizing entity as at 22, wherein the system and method of the present invention preferably restricts communication between the custodial authorizing entity and the merchant except to conduct a normal verification as will be explained.

The verified customer thereafter and preferably within a time limit to be determined by the customer and pre-coded in association with the transaction code, will directly or through an authorized representative communicate the transaction code to the merchant as at 24. The system and method of the preferred embodiment of the present invention contemplates that only the verified customer will transmit the generated transaction code to the merchant in the case of a remote commercial transaction, thereby limiting knowledge of the transaction code to those parties having a need to know. Of course, however, as the transaction code will generally have a limited value as defied by the verified customer when obtained, the verified customer may designate an agent or other entity to act as the customer on his/her behalf, with the amount of potential liability to be experienced by such a transaction to be limited to the amount defined by the verified customer when obtaining the transaction code.

At this point the purchase is consummated at least from the customer standpoint in that the customer has previously established the acceptable status of the account. Therefore the customer feels free to disclose the transaction code to the merchant or merchants instead of the actual credit card number as at 22, 24 and is relatively unconcerned if the transaction code is published or otherwise disseminated to unauthorized entities. In a preferred embodiment wherein a merchant identifier is pre-coded in association with the transaction code, the pre-coding of the transaction code will prohibit an unauthorized use due at least in part to the fact that the merchant is specifically identified and any attempt to use the transaction code other than by the identified merchant will be prohibited. In addition, the merchant is prevented from "overcharging" or "extending" the purchase by fixing the dollar amount to satisfy the specific cost or limit of the purchase as well as a specific time limit or time parameters in which the authorization for payment is valid. Such information, as set forth above, is communicated by the requested and subsequently designated payment category as set forth above. Restricted communication between the merchant and the custodial authorizing entity as at 26 is permitted exclusively for purposes of verification of the transaction code in a manner, which may utilize, at least to some extent, conventional facilities for the verification of a credit card number by most merchants or like commercial establishments. As a result, the merchant also has a desired verification as to the validity of a transaction and can effectively make arrangements to be paid by the credit card company.

If for some reason the transaction code is refused verification, the customer may be informed directly by the merchant as at 28 and or the transaction may be terminated as at 30. Assuming verification of the transaction code by the custodial authorizing entity, the merchant proceeds to consummate the purchase and send the order, as at 32, in the case of a remote commercial transaction.

Figure 3:
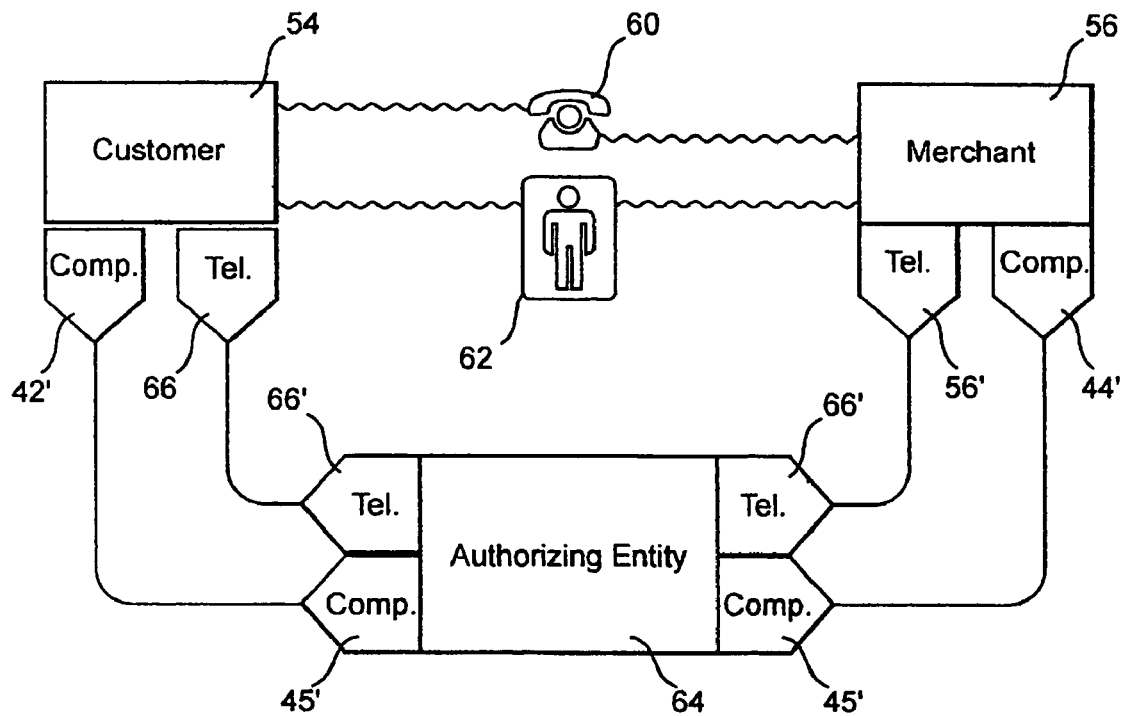
FIG. 3 is a schematic representation similar that of FIG. 2 wherein customer to merchant contact is established either by phone or in person.

FIGS. 3 and 4 are representative of the versatility of the system and method of the present invention wherein the customer 54 may receive the aforementioned promotional information from the merchant 56 by any appropriate means such as television solicitation as at 58, phone solicitation as at 60 and/or personal solicitation as at 62. Once the customer receives the promotional information, which may include the viewing of the product itself, or in advance if a general estimate as to the ultimate cost of an anticipated purchase(s) can be made prior to viewing promotional information, the customer contacts the custodial authorizing entity 64 by any appropriate electronic or conventional facilities such as direct phone to phone contact as at 66 and 66' or direct computer contact as at 42', 45'. Once the customer's authorization is confirmed, details of the anticipated transaction are established so as to determine a payment category, and a transaction code is issued to the customer. The customer, either directly or through a representative, can then utilize the transaction code to consummate a transaction within the defined parameters of the payment category. Moreover, the merchant 56, through a conventional, yet restricted communication with the custodial authorizing entity 64 by any of a plurality of conventional or electronic methods using computer to computer linking as at 44', 45' or by telephone transmission as at 56', 66', can obtain a verification and subsequent payment utilizing the transaction code only.

As emphasized above, an important feature of the present invention is the ability of the customer to request a desired or a required payment category and the ability of the custodial authorizing entity 64 and/or a processing computer 45 of the custodial authorizing entity to issue a transaction code in accordance with the payment category. The payment categories, may be collectively defined as a variety of different types of transactions. Such transactions may include a single transaction for a specific amount of a purchase to be consummated. Alternatively, the payment category may include a single transaction defined by a single purchase having a maximum limit amount, wherein the specific or precise cost of the purchase has not been determined for a variety of reasons, and as such, the customer desires to set a maximum amount for which the single transaction may be made. Accordingly, with such a payment category, the exact amount may not be known in advance, but the customer is assured of not paying over the specifically designated maximum limit. In addition, the transactions are preferably, but not necessarily, authorized to be conducted only over a fixed life period of time, such as within twenty four hours, thereby ensuring that an outstanding transaction code does not remain valid if not used as generally intended. This limited time period can, of course be varied or omitted depending upon the wishes of the customer and/or the policies of the custodial authorizing entity. Also, these or any other payment category transactions may include a specific merchant identification to further restrict use of the transaction code.

The payment category may also include a multi-transaction authorization wherein more than one purchase may be made from one or a plurality of different merchants, each of which may or may not be identified by the customer and pre-coded in association with the transaction code, and wherein a total cost of the plurality of purchases may not exceed a maximum limit amount. This transaction can also be limited to having to take place within a predetermined, designated fixed life span, such as but not limited to twenty four hours. Accordingly, in some instances wherein a customer, or an agent of the customer, such as a child, guardian, or care giver, must make a number of transactions or purchases which are authorized by the customer, the customer may designate a maximum amount which can be spent utilizing a particular transaction code within a predetermined period of time, and/or can designate that only one merchant, whether designated or not, can use the transaction code.

As yet another alternative, the payment category may include a repeating transaction for a specific amount to be paid in each of a fixed number of intervals. For example, the customer may which to join a gym or receive services or products over a fixed number of payment intervals, such as every thirty days. Accordingly, the merchant will be authorized to charge the credit card account designated by the corresponding transaction code a fixed monthly payment. Similarly, a repeating transaction for a stated minimum interval such as every thirty days may be authorized for a specific amount for an unspecified number of intervals wherein the merchant will be authorized to continuously obtain payment on a "monthly" basis until the customer decides to cancel such authorization.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A method of performing secure credit card purchases, said method comprising:
   a) contacting a custodial authorizing entity having custodial responsibility of account parameters of a customer's account that is used to make credit card purchases;
   b) supplying said custodial authorizing entity with at least account identification data of said customer's account;
   c) defining a payment category including at least limiting purchases to a single merchant for at least one transaction, said single merchant limitation being included in said payment category prior to any particular merchant being identified as said single merchant;
   d) designating said payment category thereby designating at least that a transaction code generated in accordance with said payment category can be used by only one merchant;

e) generating a transaction code by a processing computer of said custodial authorizing entity, said transaction code reflecting at least the limits of said designated payment category to make a purchase within said designated payment category;

f) communicating said transaction code to a merchant to consummate a purchase with defined purchase parameters;

g) verifying that said defined purchase parameters are within said designated payment category; and h) providing authorization for said purchase so as to confirm at least that said defined purchase parameters are within said designated payment category and to authorize payment required to complete the purchase.

2. The method of claim 1 further comprising the step of designating said single merchant subsequent to generating said transaction code.

3. The method of claim 1 wherein said step of communicating the transaction code to said merchant to consummate said purchase within defined purchase parameters further comprises designation of said single merchant.

4. The method of claim 1 wherein said step of generating said transaction code further comprises said customer obtaining said transaction code.

5. The method of claim 1 further comprising obtaining said authorization for said purchase from the custodial authorizing entity.

6. The method of claim 1 further comprising a step of communicating promotional information of offered subject matter to the customer by the merchant, pre-determining the purchase parameters of the purchase, and corresponding said designated payment category to said purchase parameters.

7. The method of claim 1 further comprising the merchant communicating the transaction code to the custodial authorizing entity for verification.

8. The method of claim 1 further comprising generating a transaction code which reflects at least one of a plurality of said payment categories.

9. The method of claim 8 further comprising defining at least one of said plurality of payment categories to include amount parameters for a cost of one or more purchases.

10. The method of claim 8 further comprising defining at least one of said plurality of payment categories to include time parameters during which the purchase can be completed.

11. The method of claim 8 further comprising defining at least one of said plurality of payment categories to include using said transaction code for a single transaction at a fixed amount for purchase within a predetermined period of time.

12. The method of claim 8 further comprising defining at least one of said plurality of payment categories to include using said transaction code for a single transaction at a maximum amount for purchase within a predetermined period of time.

13. The method of claim 12 further comprising defining at least one of said plurality of payment categories to include limiting purchases to said single transaction at said maximum amount for purchase within said predetermined period of time.

14. The method of claim 8 further comprising defining at least one of said plurality of payment categories to include using said transaction code for at least two purchases at a maximum total amount for items purchased within a predetermined time period.

15. The method of claim 14 further comprising defining at least one of said plurality of payment categories to include limiting purchases to said at least two purchases at said maximum total amount for items purchased within said predetermined time period.

16. The method of claim 8 further comprising defining at least one of said plurality of payment categories to include using said transaction code for at least two purchases for a repeating transaction at a fixed amount payable at each of a fixed number of time intervals.

17. The method of claim 16 further comprising defining at least one of said plurality of payment categories to include limiting purchases to said repeating transaction at said fixed amount payable at each of said fixed number of time intervals.

18. The method of claim 8 further comprising defining at least one of said plurality of payment categories to include using said transaction code for a repeating transaction at a fixed amount payable at each of an unspecified number of time intervals.

19. The method of claim 18 further comprising defining at least one of said plurality of payment categories to include limiting purchases to said repeating transaction at said fixed amount payable at each of said unspecified number of time intervals.

20. The method of claim 8 wherein said plurality of payment categories further include at least one of the group consisting of:

a) using said transaction code for a single transaction at a fixed amount for a purchase within a predetermined period of time, b) using said transaction code for a single transaction at a maximum amount for a purchase within a predetermined period of time, c) using said transaction code for multiple transactions at a maximum total amount for purchases within a predetermined time period, d) using said transaction code for a repeating transaction at a fixed amount for purchases payable at each of a fixed number of time intervals, and e) using said transaction code for a repeating transaction at a fixed amount for purchases payable at each of an unspecified number of time intervals.

21. The method of claim 8 wherein said plurality of payment categories further include at least one of the group consisting of:

a) using said transaction code for a single transaction at a fixed amount for a purchase, b) using said transaction code for a single transaction at a maximum amount for a purchase, c) using said transaction code for multiple transactions at a maximum total amount for purchases, d) using said transaction code for a repeating transaction at a fixed amount for purchases payable at each of a fixed number of time intervals, and e) using said transaction code for a repeating transaction at a fixed amount for purchases payable at each of an unspecified number of time intervals.

22. The method of claim 1 further comprising generating said transaction code to further reflect an identification of said single merchant.

23. The method of claim 22 further comprising defining said payment category to include limiting purchases to a limited time interval during which said purchase is permitted.

24. A method of performing secure credit card purchases, said method comprising:

a) identifying a pre-established account that is used to make credit card purchases;

b) designating at least one of a plurality of pre-defined payment categories which limit a nature of a subsequent purchases, at least one of said payment categories including limiting purchases to a single merchant, said single merchant limitation being included in said payment category prior to any particular merchant being identified as said single merchant;

c) generating a transaction code by a processing computer of a custodial authorizing entity of said pre-established account, said transaction code associated with at least said pre-established account and the limits of said selected payment category, and different from said pre-established account;

d) communicating said transaction code to a merchant to consummate a purchase within defined purchase parameters;

e) verifying that said defined purchase parameters correspond to said designated payment category; and f) providing authorization for said purchase so as to confirm at least that said defined purchase parameters are within said designated payment category and to authorize payment required to complete the purchase; and g) associating the purchase with said pre-established account.

25. A method of performing secure credit card purchases, said method comprising:

a) identifying a pre-established account that is used to make credit card purchases;

b) selecting a predetermined payment category which limits a nature, of a series of subsequent purchases to a single merchant, said single merchant limitation being included in said payment category prior to any particular merchant being identified as said single merchant;

c) generating a transaction code by a processing computer of a custodial authorizing entity of said pre-established account, said transaction code associated with at least said pre-established account and the limits of said selected payment category and different from said pre-established account;

d) communicating said transaction code to a merchant to consummate a purchase within defined purchase parameters;

e) verifying that said defined purchase parameters correspond to said selected payment category;

f) providing authorization for said purchase so as to confirm at least that said defined purchase parameters are within said selected payment category and to authorize payment required to complete the purchase; and g) associating the purchase with said pre-established account.

26. The method of claim 25 wherein said step of selecting said payment category which limits said nature of said series of subsequent purchases to said single merchant further comprises limiting said nature of said series of subsequent purchases to a fixed amount for each of said subsequent purchases.

27. The method of claim 25 wherein said step of selecting said payment category which limits said nature of said series of subsequent purchases to said single merchant further comprises limiting said nature of said series of subsequent purchases to a maximum total amount for said subsequent purchases.

28. The method of claim 25 wherein said step of verifying that said defined purchase parameters correspond to said selected payment category further identifies said merchant as said single merchant.

29. A method of performing secure credit card purchases, said method comprising the steps of:

a) identifying a pre-established account that is used to make credit card purchases;

b) selecting a pre-determined payment category which limits a nature of a subsequent purchase to a single merchant, said single merchant limitation being included in said payment category prior to any particular merchant being identified as said single merchant;

c) generating a transaction code by a processing computer of a custodial authorizing entity of said pre-established account, said transaction code associated with at least said pre-established account and the limits of said selected payment category, and different from said pre-established account;

d) designating a merchant as said single merchant;

e) communicating said transaction code to said merchant to consummate a purchase within defined purchase parameters;

f) verifying that said defined purchase parameters correspond to said selected payment category;

g) providing authorization for said purchase so as to confirm at least that said defined purchase parameters are within said selected payment category and to authorize payment required to complete the purchase; and h) associating the purchase with said pre-established account.

30. The method of claim 29 wherein said step of verifying that said defined purchase parameters correspond to said selected payment category further identifies said merchant as said single merchant.

* * * * *

UNITED STATES PATENT AND TRADEMARK OFFICE
CERTIFICATE OF CORRECTION

| | | |
|---|---|---|
| PATENT NO. | : 7,840,486 B2 | Page 1 of 1 |
| APPLICATION NO. | : 11/252009 | |
| DATED | : November 23, 2010 | |
| INVENTOR(S) | : John D'Agostino | |

Figure 2:
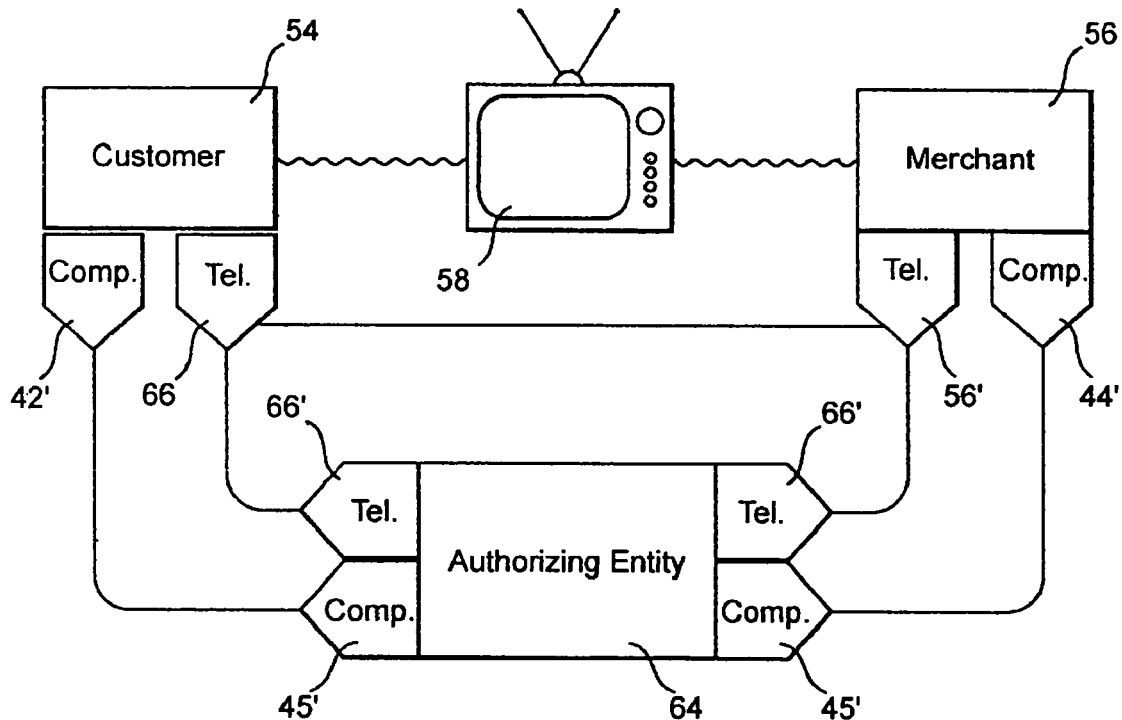
FIG. 2 is a schematic representation similar to that of FIG. 1 wherein customer to merchant contact is accomplished by conventional facilities such as television.

It is certified that error appears in the above-identified patent and that said Letters Patent is hereby corrected as shown below:

Column 7, line 25, replace "FIGS. 3 and 4"
    with -- FIGS. 2 and 3 --

Column 11, line 9, claim 24.c)

replace "said selected payment category"
    with -- said designated payment category --

Signed and Sealed this
Twenty-sixth Day of April, 2011

David J. Kappos
*Director of the United States Patent and Trademark Office*

UNITED STATES PATENT AND TRADEMARK OFFICE
CERTIFICATE OF CORRECTION

PATENT NO. : 7,840,486 B2
APPLICATION NO. : 11/252009
DATED : November 23, 2010
INVENTOR(S) : John D'Agostino Page 1 of 1

It is certified that error appears in the above-identified patent and that said Letters Patent is hereby corrected as shown below:

Column 9, line 7, claim 1.f)

replace "purchase with defined"
with -- purchase within defined --

Signed and Sealed this
Twelfth Day of February, 2013

Teresa Stanek Rea
*Acting Director of the United States Patent and Trademark Office*